Aug. 18, 1953 J. B. FAIRBANKS 2,649,016
PICTURE AND SOUND SYNCHRONIZING METHOD AND SYSTEM
Filed Nov. 7, 1949 3 Sheets-Sheet 2

JERRY B. FAIRBANKS
INVENTOR.

BY
ATTORNEY

JERRY B. FAIRBANKS
INVENTOR.

Patented Aug. 18, 1953

2,649,016

UNITED STATES PATENT OFFICE 2,649,016

PICTURE AND SOUND SYNCHRONIZING METHOD AND SYSTEM

Jerry B. Fairbanks, Los Angeles, Calif.

Application November 7, 1949, Serial No. 125,998

6 Claims. (Cl. 88—16.2)

This invention relates to motion picture sound equipment, and particularly to the synchronization of one or more picture films with a sound film on which the concomitant sound is recorded.

In the production of motion pictures, it is well-known that a scene is photographed on one film in a camera and the sound to accompany the scene is photographed on a separate sound film in a sound recorder. To properly combine the sound and picture on a final composite print, it is necessary that the action film be marked so as to permit the combination thereof with the sound film. This has been accomplished in several ways in the past, such as by holding a slate board having clap sticks thereon in front of the motion picture camera, and in proximity to the pickup microphone, so that when the clap sticks are brought together, the movement thereof will be photographed, and the sound therefrom will be recorded on the sound film. Other forms of synchronization have also been suggested and used in motion picture production.

The present invention, however, is directed to a synchronizing system, whereby not only a single picture camera film may be marked to correspond with a mark on the sound film, but a plurality of picture cameras operating either in series or simultaneously at different starting times, may be individually identified on the sound film so that a cutter or editor can determine what portion of the sound track corresponds with a scene photographed with a certain camera or cameras. For instance, one camera may be photographing a long shot of the scene, and the concomitant sound from the scene is being recorded. While this camera continues to photograph the scene, or at a later time in the scene, another camera may be started to photograph a close-up of the scene, the sound, however, being the same. With the present invention, the sound track film will show the start of and identify the first camera and also show the start of and identify the second camera, so that, in the event the cutter wishes to intercut the close-up scene into the picture continuity, he may easily and accurately do so. If a third camera is also employed in the photographing of a scene for another period during the photographing of the scene, the starting of and identity of this third camera will also be shown on the sound film. Thus, the picture film, because of its being used in a certain camera, will be provided with a mark to indicate the particular camera photographing the scene, and the sound film will indicate whether one, two, or three cameras are simultaneously photographing the scene and provide the necessary synchronization or start marks thereon. In this manner, several cameras may be employed in photographing scenes, as disclosed and claimed in my co-pending application, Ser. No. 125,997, filed November 7, 1949, and the picture sequences readily combined with the sound track.

The principal object of the invention, therefore, is to facilitate the synchronizing of one or more picture films with a sound film.

Another object of the invention is to provide an improved synchronizing method of and system for producing start and identification marks on separate picture and sound films.

A further object of the invention is to provide an improved method of and system for synchronizing a plurality of picture films on which a scene is photographed with the sound record of the concomitant sound therefor.

A still further object of the invention is to provide an improved multiple start and identification marking system for a plurality of picture films and a sound film.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 2:
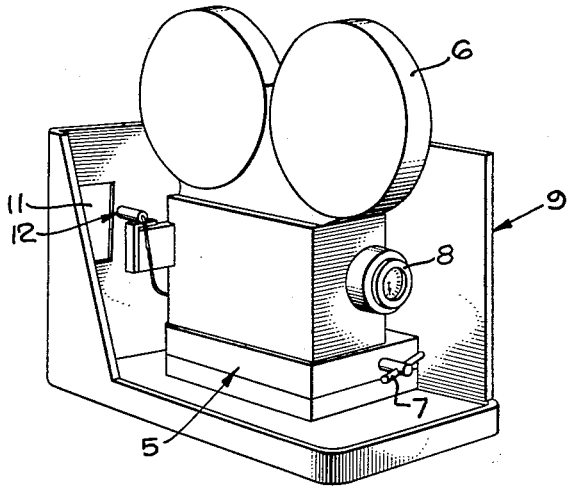
Fig. 2 is a perspective view of a motion picture camera which may be used in the invention.
Figure 4:
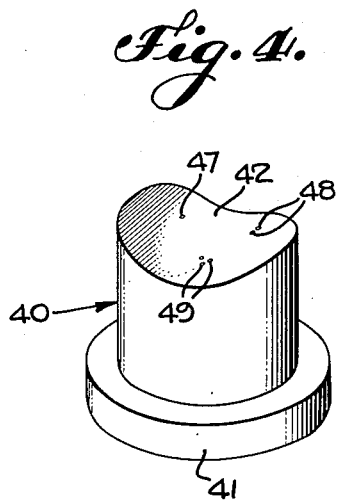
Fig. 4 is a perspective, detailed view of the selective marking system for the sound recorder.
Figure 3:
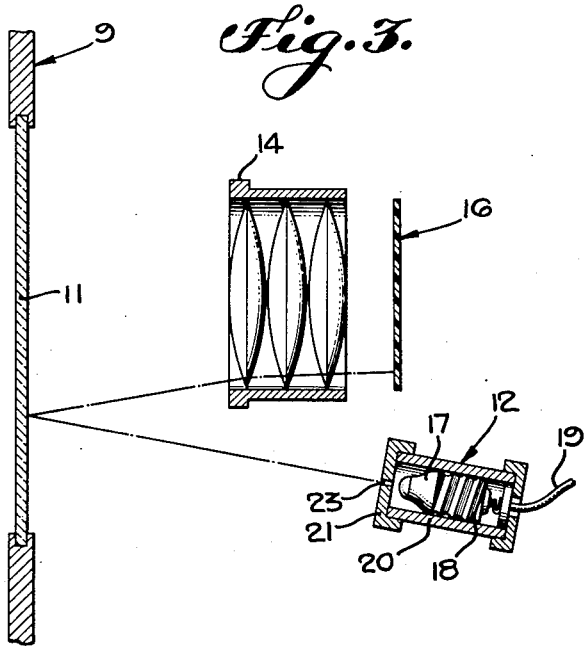
Fig. 3 is a cross-sectional, detailed view of the picture film marking portion of the invention.

Referring now to the drawings, in which the same numerals identify like elements, and referring particularly to Fig. 2, any standard type of motion picture camera is shown at 5 having a magazine 6, a hand rack crank 7, a meter 8, and a blimp case 9. The case 9 has an opening in the front through which a scene may be photographed in the normal manner. Mounted in the front wall of the case 9 is a glass 11 which reflects light from a light source 12 through the photographing lens 14 to one edge of the picture film, such as shown at 16 in Fig. 3. The light source 12 may be a simple projecting lamp 17, mounted in a socket 18, and connected to an energy supply over cable 19, the lamp being housed in a casing 20 having a front cap member 21.

Figure 6:
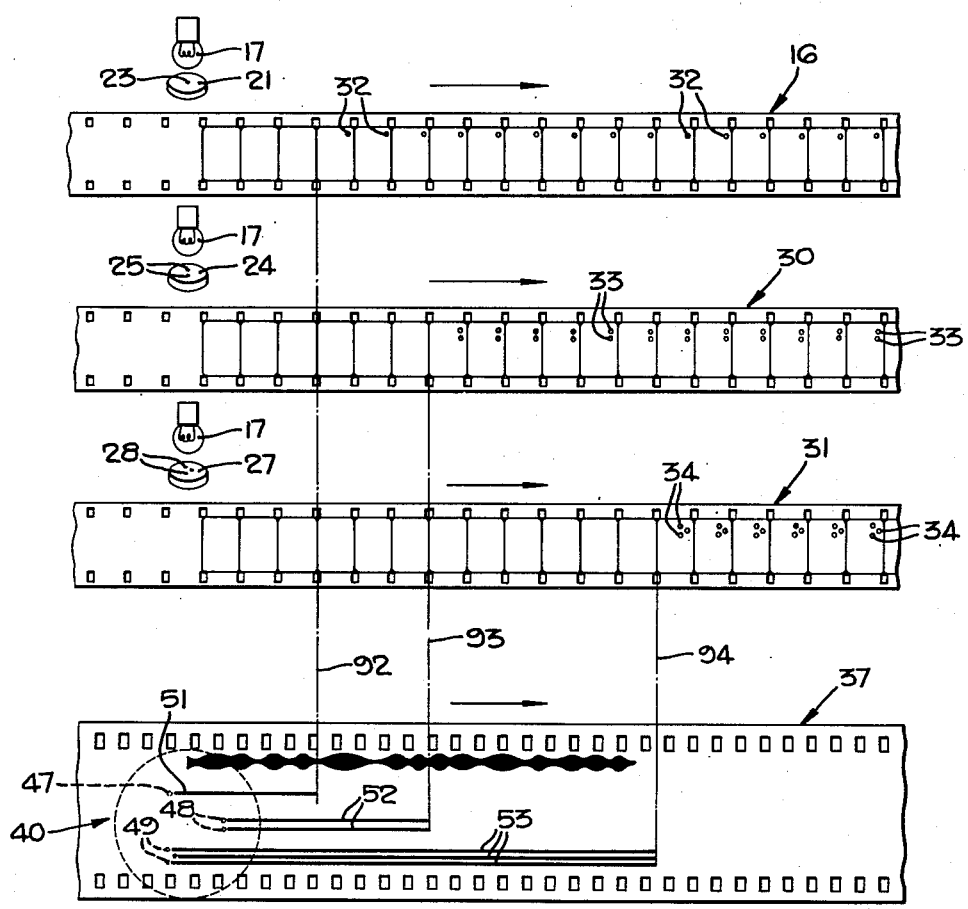
Fig. 6 is a composite view showing the markings on a plurality of picture films and the corresponding sound film.

In camera No. 1, the cap member 21 may have a single opening 23 therein, as shown in Fig. 6. On camera No. 2, another light source may be enclosed in a similar casing and have a cap 24, in which a pair of openings 25 are provided, while, in a camera No. 3, a cap 27 may be used having triple openings 28, as shown in Fig. 6. In this manner, light will be reflected from the respective light sources to the respective films 16, 30, and 31, and, since the light beams from the respective lamps are interrupted by the motion picture shutter, dot light images will be impressed upon the frames of the respective films. As shown in Fig. 6, one camera will provide single dot images, such as shown at 32; the second camera will provide double dot images, such as shown at 33; and the third camera will provide triple dot images, such as shown at 34. Thus, each camera's picture film will have characteristic marks thereon, which will identify the film as having been photographed by a certain camera.

Figure 5:
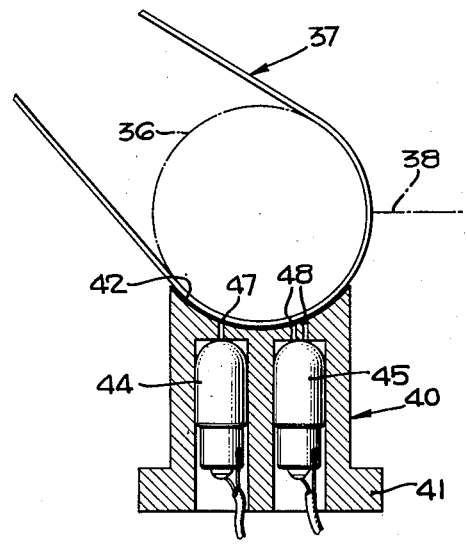
Fig. 5 is a cross-sectional view of the selective marking portion for the sound recorder.

Not only are the single, double, and triple dot images provided to identify the camera, but the point of discontinuance of these images on the picture films provides a mark which will correspond with respective marks on the sound film, as will now be described. It is well-known that most commercial type sound recorders employ a sound drum over which the film passes to provide it with a uniform film motion. In photographic recording, sound modulated light is impressed upon the film while on the drum. This is illustrated in Fig. 5, wherein a sound drum is indicated by the broken line 36 and is shown with a sound film 37 passing thereover. Sound modulated light may be impressed on the film at a point, such as shown at 38. The present invention provides the sound recorder with a cylindrical casting 40 having a base rim 41, which has an upper circular dished surface 42, and which is drilled to accommodate a plurality of lamps, such as three, two of which are shown at 44 and 45.

Drilled in the upper, curved surface 42 on the casting 40, is a plurality of groups of openings, a single opening being shown at 47, a pair of openings at 48, and triple openings at 49. Thus, if one or more of the lamps are energized, light will pass through the respective openings to the sound film 37, and will provide thereon light line images in groups of one, two, or three, such as shown on film 37 at 51, 52, and 53, respectively, in Fig. 6. When camera No. 1 provides a single dot picture film image 32, a single light line 51 will be provided on the sound film, and when camera No. 2 provides a double dot picture film image 33, two lines 52 will be shown on the sound film, and when camera No. 3 provides a triple dot image 34, a three-line image 53 will be shown on the sound film. When only one camera is operating, only one characteristic identification mark will be shown on the sound film, while, if two or more cameras are operating, the sound film will so indicate.

Figure 1:
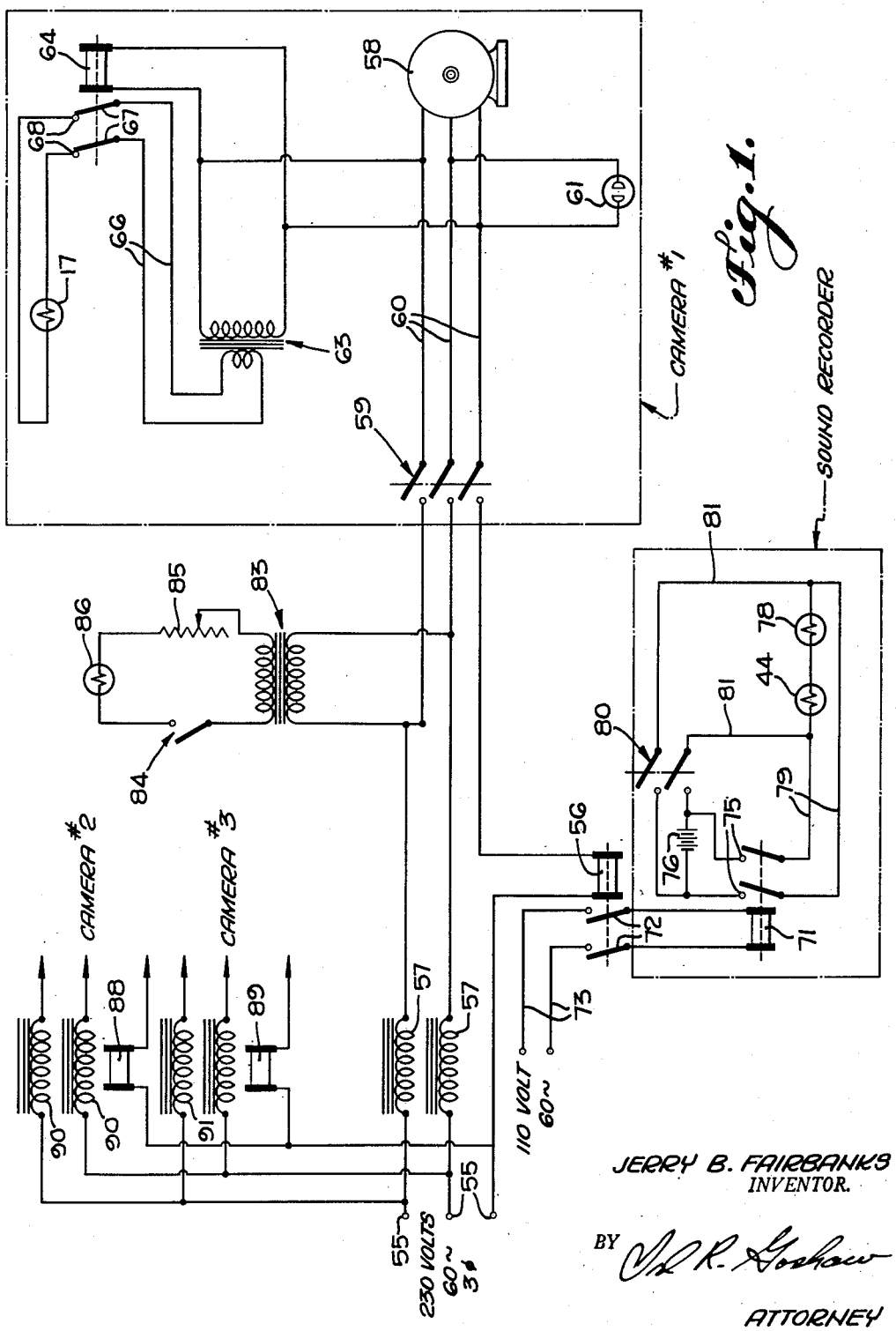
Fig. 1 is a schematic diagram of the synchronizing circuit embodying the invention.

As just described, the sound film will identify the particular camera photographing the scene from which the sound is being recorded. In addition to this identification of camera and sound films, the marks on the respective picture and sound films also provide synchronization or start marks, whereby the sound film may be combined with any one or more picture films photographing the scene. To describe how this is accomplished, reference is made to the circuit in Fig. 1, whereby the usual 230 volts, sixty-cycle, three-phase power source is connected to terminals 55. Power is transmitted over three conductors, one of which includes a solenoid relay 56, and the other two of which include coils 57, which are used solely to balance the line due to the insertion of the relay 56 in one of them. At the camera, there is provided the usual camera motor 58, which is energized over conductors 60 when a main start switch 59 is closed. Bridged across two of the conductors 60, is an action light 61, which may be mounted on the camera to indicate that the camera is energized and is photographing a scene. Bridged across another pair of power conductors, is the primary of a transformer 63 in parallel with a relay 64, the contacts 68 of which are normally closed. The secondary of transformer 63 is connected over conductors 66 to the swingers 67 of the relay 64, while the contacts 68 of the relay are connected to a picture film marking lamp, such as 17. (See Fig. 3.)

At the sound recorder, a second relay 71 is provided, which is connected to the swingers 72 of the relay 56, so that when relay 56 is energized, the relay 71 will be immediately connected to a 110-volt, sixty-cycle supply over conductors 73. The energization of relay 71 will close its contacts 75, which impresses energy from a source 76 on lamps 44 and 78, connected in series over conductors 79. The lamp 44 is the sound film marking lamp, as shown in Fig. 5, while the lamp 78 may be mounted on the panel of the recorder to indicate to the operator that the lamp 44 is energized. To test the lamps 44 and 78 at periodic intervals, a test circuit is provided from the battery 76 over a switch 80, which, when closed, will impress the energy from the battery 76 on the lamps 44 and 78 over conductors 81. Normally, the switch 80 is open.

Also connected across a pair of power conductors, is the primary of a transformer 83, which has its secondary, over a switch 84 and a rheostat 85, connected to a light 86. The light 86, as disclosed and claimed in my co-pending application, Serial No. 125,996, filed November 7, 1949, now abandoned, is mounted on the front of the camera blimp in a housing to illuminate the action in the scene, and may be energized when desired by operation of the switch 84. Also connected across the power line terminals 55, are three identical circuits to the one just described, these circuits being indicated by relays 88 and 89 corresponding to relay 56, and balancing inductances 90 and 91 corresponding to inductances 57.

To explain the operation of the circuit and system, when it is desired to operate a camera, such as 5, the power switch 59, located at the camera, will be closed, which will simultaneously energize the motor 58, the action light 61, the primaries of transformers 63 and 83, and the relays 56 and 64. The relay 56 immediately closes its contacts and energizes relay 71. However, relays 64 and 71 are time delay relays, which have been adjusted to operate in a certain predetermined time period, which may be in the neighborhood of one second. This time period is required to permit the camera or cameras to get up speed. The sound recorder has already been brought up to speed prior to the closing of switch 59.

After the predetermined time period, the relay 71 closes its contacts and energizes the lamps 44 and 78, while, at the same instant, the relay 64 opens its contacts 68, de-energizing the lamp 17, which was energized immediately upon the closing of the switch 59 over transformer 63, conductor 66, swingers 67, and contacts 68. Assuming camera No. 1 is energized, the film 16 is brought up to speed, during which time the characteristic dot images, such as shown at 32, will be impressed on the picture film, since it is advanced in the direction shown by the arrow, and these dot images will continue as long as lamp 17 is energized and the lamp will remain energized until the relay 64 opens contacts 68. However, since relays 64 and 71 have the same delay time period, when contacts 68 are opened, contacts 75 will close, which energizes lamps 44 and 78 at the recorder. This action, therefore, impresses the characteristic light image or pattern on the sound film, such as shown at 51 in Fig. 6, and the impression of this light will be at the same instant that the dot images are discontinued on the picture film. Thus, the picture film 16 is synchronized with the sound film 37, as shown by the broken line 92, the sound film 37 being advanced in the direction shown by the arrow.

Now, if camera No. 2 were energized, then camera film 39 would have the characteristic double dot images 33, and when they were discontinued, the sound film would be impressed with images 52 and the ending and beginning of the respective marks would indicate correspondence between the films, as indicated by the broken line 93. Similarly, the third camera would provide its characteristic identification and start marks along with the marks on the sound film, as indicated by the broken line 94. If one of the cameras is started and the others are started subsequently, or if they are run independently or simultaneously in any order, the markings will be applied to the respective films accordingly, Fig. 6 showing the operation of all three cameras and the respective start marks therefor. In this manner, the cutter or editor can select the particular scenes from the different films which will best depict the story, and be able to edit and cut the sound film accordingly, thus providing a relatively rapid method of and system for accomplishing the synchronization of one or more picture films with a sound film on which the concomitant sound is recorded. It will be noted that the sound film characteristic identification marks continue on the sound film as long as a particular camera or cameras are photographing, so that the camera may be identified at any point along the sound film. Although one means of impressing particular characterized light marks on said picture and sound films has been disclosed, other forms of light sources and other forms of marking could be employed.

I claim:

1. A picture and sound system comprising: a motion picture camera for photographing a scene on a picture film; sound-recording means for recording sound accompanying said scene; a light source for said camera for recording a characteristic light image on said picture film to identify the film from said camera; a light source in said sound recording means for recording a characteristic light image of the same type on film in said sound recording means in synchronism with the recording of said sound; means for energizing each of said light sources; and control means including a normally closed time delay relay means operable to effect the interruption of said light source at said camera that records said characteristic light image on said camera film, and a normally open time delay relay means operable to effect the operation of said light source in said sound recording means that records said characteristic light image on said recorder film, both of said relay means having the same delay period and being energized upon energization of said camera, whereby said light source at said camera is interrupted after a predetermined time, and said light source in said sound recording means is simultaneously rendered effective and thereafter maintained in that condition.

2. A picture and sound system comprising: a plurality of motion picture cameras for photographing a scene on picture film; sound recording means for recording sound accompanying said scene; a light source for each of said cameras for recording a characteristic light image on said picture film to identify the film from each of said cameras; a plurality of light sources in said sound recording means for recording characteristic light images, corresponding to those impressed upon said picture films, on film in said sound recording means in synchronism with the recording of said sound; means for energizing each of said light sources; and control means operable to effect the interruption of one of said light sources for recording light upon one of said camera films after a predetermined length of time, and to effect the operation of the corresponding light source in said recording means after said predetermined length of time.

3. A film identification and synchronization marking system for a plurality of picture films in a corresponding plurality of cameras, and a film in a sound recording means operated concurrently therewith comprising: means providing a characteristic light image different for each of said cameras; means for recording one of said images on each of said camera films to identify the film from each of said cameras; means providing a plurality of characteristic light images, each corresponding to one of said characteristic light images provided for said cameras; means for simultaneously recording any desired number of said plurality of characteristic light images upon said film in said sound recording means; and means for discontinuing the recording of a characteristic light image upon a camera film substantially simultaneously with the initiating and continuing of the recording of said corresponding characteristic light image upon said film in said sound recording means.

4. A photographic sound system comprising: a camera; sound recording means; means for impressing a light beam on the film in said camera, said light beam being delineated to identify the film from said camera; means for impressing a light beam on a film in said recording means, said light beam being delineated in the same general manner as said camera light beam; a motor for said camera; means for simultaneously energizing said motor and said first-mentioned light impressing means; means for discontinuing the energization of said first-mentioned light impressing means; means for controlling the energization of said second-mentioned light impressing means; and means for simultaneously energizing said energization discontinuing means and said energization controlling means.

5. A photographic sound system in accordance with claim 4, in which said energization discontinuing means and said energization controlling means are time delay relays having substantially the same time period.

6. The method of identifying each of a plurality of cameras photographing a scene concurrently with the recording of sound accompanying said scene, which includes: recording a different identifying characteristic image on the film in each of said cameras identifying each of the films in said particular cameras; recording characteristic images corresponding to each identifying characteristic image, respectively, on film in a recorder means in synchronism with the recording of said sound; and terminating the said recording of said identifying characteristic images on said camera films substantially at the time of initiating and continuing said recording of said respective corresponding characteristic images on said recorder film.

JERRY B. FAIRBANKS.

References Cited in the file of this patent

UNITED STATES PATENTS

| Number | Name | Date |
|---|---|---|
| 1,771,940 | Robinson | July 29, 1930 |
| 1,950,091 | Owens | Mar. 6, 1934 |
| 2,044,333 | Schmidt | June 16, 1936 |
| 2,282,957 | Fields | May 12, 1942 |
| 2,365,212 | Oriol | Dec. 19, 1944 |

FOREIGN PATENTS

| Number | Country | Date |
|---|---|---|
| 377,944 | Great Britain | Jan. 28, 1931 |